United States Patent Office 2,800,467
Patented July 23, 1957

2,800,467

PHOSPHORUS SESQUISULFIDE-OLEFIN-ORGANIC PEROXIDE REACTION PRODUCTS AND METHOD OF PREPARATION THEREOF

William E. Garwood, Haddonfield, and Lyle A. Hamilton, Pitman, N. J., assignors to Socony Mobil Oil Company, Inc., a corporation of New York No Drawing. Application October 21, 1953,
Serial No. 387,525

17 Claims. (Cl. 260—139)

This invention relates to a novel class of acidic, phosphorus- and sulfur-containing reaction products and to a process of producing the same. More particularly, it is concerned with novel reaction products produced by the reaction involving phosphorus sesquisulfide ($P_4S_3$), an olefin and an organic peroxide and with neutralized or partially neutralized derivatives thereof, such as metal salts. The invention is also concerned with hydrocarbon oils containing the aforesaid products.

Prior to this invention, it has been known that olefinic hydrocarbons will react with certain phosphorus sulfides, particularly phosphorus pentasulfide ($P_2S_5$). However, although the prior art mentions $P_4S_3$ along with other phosphorus sulfides as being suitable for reaction with olefinic hydrocarbons, as far as the present applicants are aware, there have been no examples shown where $P_4S_3$ was employed as the phosphorus sulfide reactant. Furthermore, although the prior art indicates the equivalency of the various phosphorus sulfides, including $P_4S_3$ and $P_2S_5$, for such reactions, we have found that this is actually not the case. Specifically, we have found that when $P_4S_3$ is used in the reaction, little or no yield of phosphorus- and sulfur-containing products are obtainable under the conditions taught in the art. Thus, for example, the patent to Loane et al., No. 2,316,083, teaches the reaction of phosphorus sulfides, particularly $P_2S_5$, with olefinic hydrocarbons at temperatures of from about 200° F. to about 500° F., preferably in a nonoxidizing atmosphere, such as an atmosphere of nitrogen, to produce phosphorus- and sulfur-containing products. However, we have found that with $P_4S_3$ as the phosphorus sulfide reactant at a temperature of 300° F. in a nitrogen atmosphere, no reaction takes place, while at 500° F., i. e., the upper temperature limit taught by Loane et al., reaction occurs only to a very slight extent, the yield of phosphorus- and sulfur-containing reaction products being in the order of only 4 or 5 percent. $P_4S_3$, therefore, does not react with olefinic hydrocarbons, as does $P_2S_5$, under the conditions taught in the art.

We have now discovered that $P_4S_3$ reacts quite readily with olefinic hydrocarbons and organic peroxides, under conditions where little or no reaction takes place between $P_4S_3$ and olefinic hydrocarbons alone, i. e., at temperatures of from about 100° F. to about 500° F. in a non-oxidizing atmosphere, to produce phosphorus- and sulfur-containing products in substantial yield. These products are different from the products obtained in very low yield by the reaction of $P_4S_3$ with olefinic hydrocarbons at 500° F. in a non-oxidizing atmosphere, since they have higher molecular weights and higher phosphorus and sulfur contents than the latter products. They also differ from products produced by reacting $P_4S_3$ with olefinic hydrocarbons in an oxidizing atmosphere, such as in the presence of air, since these latter products are insoluble in petroleum hydrocarbon fractions. Accordingly, it is the primary object of this invention to provide novel, oil-soluble phosphorus- and sulfur-containing reaction products and derivatives thereof. Another object is to provide a novel method for the production of such oil-soluble phosphorus- and sulfur-containing reaction products. A further object is to provide a process for the production of such products which involves the reaction between $P_4S_3$, olefins and organic peroxides. Still another object is to provide oil compositions containing small amounts of these novel products or metal salts thereof. Other objects and advantages of the invention will become apparent from the following description.

Any olefinically-unsaturated aliphatic hydrocarbon may be used in the process of the invention. Thus, the hydrocarbon reactant may be a straight-chained, branch-chained or cyclic hydrocarbon having one or more bonds of ethylenic unsaturation or it may be a mixture of such unsaturated hydrocarbons. Olefin polymers obtained by the polymerization of relatively low molecular weight olefins, preferably iso-mono-olefins, such as isobutylene, are also suitable. Likewise, hydrocarbon mixtures containing low molecular weight olefins, such as refinery gases, cracked distillates, etc., may also be used. Especially preferred, however, are the acyclic, aliphatic olefins having from 2 to about 20 carbon atoms per molecule and the terpenes, chiefly due to their availability. As non-limiting examples of preferred olefins, such olefins as ethylene, propylene, pentene-1, isobutylene, 2-ethylhexene-1, octene-2, decene-1, cyclohexene, cyclopentene, di-isobutylene, tridecene, octadecene-1 and alphapinene may be mentioned.

Any of the organic peroxides known to the art can be used. Generally, these compounds are known as free-radical donors. It is to be noted, however, that in the process of this invention, these materials actually enter into the reaction and form a part of the reaction products. Suitable peroxides are, for example, diacyl peroxides, such as dibenzoyl peroxide, lauroyl peroxide, bis(p-chlorobenzoyl) peroxide, bis(2,4-dichlorobenzoyl) peroxide and acetyl peroxide. Di-n-alkyl peroxides, such as di-methyl peroxide, di-ethyl peroxide and methyl ethyl peroxide may also be used. Di-secondary-alkyl peroxides, such as di-isopropyl peroxide and di-secondary-amyl peroxides, as well as di-t-alkyl peroxides, such as di-t-butyl peroxide and di-t-amyl peroxide, are also suitable. The preferred peroxide reactants, however, are the di-t-alkyl peroxides, di-t-butyl peroxide being particularly preferred.

The reaction products of the invention may be reacted with basic reagents, such as metal hydroxides, metal carbonates, ammonia, amines, etc., to give wholly or partially neutralized products. Metal salts of the reaction products may be those of the alkali, alkaline earth or of the heavy metals, such as, for example, the salts of sodium, calcium, barium, magnesium, aluminum and tin. An excess of the neutralizing reactant may be used in preparing the metal salts whereby the product will have an excess basicity. Salts of this latter type are particularly effective detergents for lubricating oils.

The exact mechanism of the reaction which occurs between the $P_4S_3$, the olefin and the organic peroxide is not presently known to us. However, without intending to limit this invention in any way by theoretical considerations, the reaction is believed to be analogous to the reaction which occurs between yellow phosphorus, olefinic hydrocarbons and organic peroxides. This latter reaction and the products thereof have been described and claimed in our copending application Serial No. 328,704, filed December 30, 1952. As in the case of yellow phosphorus, it is known that the organic peroxide actually takes part in the reaction with the $P_4S_3$ and the olefin, since it is destroyed in the reaction and fragments thereof appear in the products formed. Thus, for example, when di-tertiary-butyl peroxide is utilized as the organic peroxide reactant, isobutylene is formed and is recoverable from the reaction on a substantially quantitative basis.

Yellow phosphorus and P₄S₃, of course, have in common trivalent phosphorus with phosphorus to phosphorus linkages, the yellow phosphorus having the tetrahedral structure:

with the bond angles of 60 degrees and P₄S₃ having a similar structure, one form being

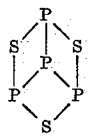

in which the bond angles are greater than 60 degrees. It is possible that the reaction of the invention depends upon the presence of the phosphorus-to-phosphorus bonds in P₄S₃.

As disclosed in the said copending application, in the case of the reaction between yellow phosphorus, decene-1 and ditertiary-butyl peroxide, analysis of the residual product indicates that it is comprised principally of a compound having the empirical formula R₆P₄(OH)₂, wherein R represents a radical corresponding to decene-1. Correspondingly, we have found that when P₄S₃ is employed in this reaction in place of yellow phosphorus, analysis of the residual product indicates that it is comprised chiefly of a compound having the empirical formula R₄P₄S₃(OH)₂, wherein R represents a hydrocarbon radical corresponding to decene-1.

On the basis of the product analysis, therefore, and also on the basis of the amount of isobutylene recovered from the reaction, the empirical equation $$4R + P_4S_3 + (C_4H_9O)_2 \rightarrow R'_4P_4S_3(OH)_2 + 2C_4H_8$$

wherein R represents decene-1 and R' represents the hydrocarbon radical corresponding to decene-1, would be suggested. However, although the aforesaid equation would seem to hold true in the case of decene-1, no general formula covering the various reaction products can be set up at this time since we have found that, as in the case of the yellow phosphorus-olefin-peroxide products, the P₄S₃ products vary in their empirical analyses, depending upon the particular reactants, i. e., the olefin and the organic peroxide, employed in the reaction. Thus, with the same olefin reactant and a different peroxide, the products differ somewhat, and vice versa. The differences between the products appear to be due to the extent to which a particular olefin polymerizes under the conditions of reaction and under the influence of the particular organic peroxide reactant. All of the reaction products, however, are characterized by the fact that they contain trivalent phosphorus, are weakly acidic and readily form neutral derivatives, such as oil-soluble metal salts.

Since the exact formula for the products of the invention is not presently known, they are defined herein by their process of preparation.

On the basis of the data adduced to date, it appears that the proportions of reactants involved in the reaction of the invention are about 4 moles of the olefin per mole of phosphorus sesquisulfide and sufficient organic peroxide to provide at least about 1 mole equivalent of free peroxy radical for each mole of P₄S₃. However, in conducting the reaction we have found it advantageous to use an excess of the olefin over the required amount, the excess olefin acting to solubilize the P₄S₃. Also, we have found it advantageous to use more than the reacting amount of P₄S₃ in the reaction, since the excess P₄S₃ acts to prevent any substantial polymerization of the olefin reactant. Broadly, therefore, the proportions of reactants which are suitable and which are contemplated for use herein are from about 4 up to about 100 moles of the olefin reactant, and from about 0.5 up to about 2.0 moles of the organic peroxide reactant, for each mole of P₄S₃. We have found that when an excess of olefin, amounting to from about 10 to about 20 moles thereof per mole of P₄S₃, and an excess of organic peroxide, amounting to about ⅔ mole per mole of P₄S₃ in the case of di-t-alkyl peroxides and at least 1⅓ moles of the peroxide per mole of P₄S₃ in the case of the di-t-acyl peroxides is used, the best yields of the desired reaction products are obtained.

Unreacted olefin and P₄S₃ may be recovered and reused in the reaction along with additional organic peroxide. Also, the degradation products of the organic peroxide reactant, such as isobutylene, may be converted back to the corresponding peroxide by methods known in the art. It is thus possible to achieve a substantially complete conversion of the reactants to the desired products.

The optimum molar proportions of reactants will vary somewhat with the different reactants, but may be readily determined by conducting several reactions. For example, in reacting decene-1, phosphorus sesquisulfide and di-t-butyl peroxide, the optimum molar ratio has been found to be about 22.5 moles of decene-1 and 1.5 moles of phosphorus sesquisulfide per mole of di-t-butyl peroxide.

The reaction proceeds readily at temperatures of from about 100° F. to about 500° F. and is generally completed in from about 1 to about 10 hours, the preferred temperature and time depending upon the particular organic peroxide reactant used.

It is important that oxygen be excluded from the reaction. This is achieved by conducting the reaction and the handling of the products in an anaerobic atmosphere, such as carbon dioxide, nitrogen, methane, etc. If the products are permitted to become oxidized, their solubility in oil is reduced.

The following specific examples will serve to illustrate more completely the method of conducting the reaction of the invention as well as the nature of the products obtained thereby.

EXAMPLE 1

A mixture of 140 grams (1.0 mole) of decene-1 and 14.7 grams (0.066 mole) of phosphorus sesquisulfide were heated with agitation in a nitrogen atmosphere in a reaction vessel for 5 hours at 335° F. During the first hour of reaction, 6.5 grams (0.0444 mole) of di-tertiary butyl peroxide were added portionwise. The cooled reaction mixture was filtered to remove unreacted P₄S₃ and then topped by heating to a liquid temperature of 342° F. under 2.2 millimeters pressure to remove unreacted decene-1. The residual product (35 grams) was a yellow oily material having the following properties:

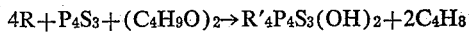

| | |
|---|---|
| Percent phosphorus | 15.2 |
| Percent sulfur | 10.8 |
| Percent carbon | 59.90 |
| Percent hydrogen | 10.34 |
| Electrometric N. N. | 140.2 |
| Molecular weight | 686.0 |

Although, as has been pointed out, it has not been possible to define a general formula for the reaction products of the invention, it will be seen that the analysis of the product of this example compares closely to the theoretical formula R₄P₄S₃(OH)₂, wherein R would represent a radical corresponding to decene-1. This theoretical compound would have the following characteristics:

| | |
|---|---|
| Percent phosphorus | 15.21 |
| Percent sulfur | 11.80 |
| Percent carbon | 59.93 |
| Percent hydrogen | 10.14 |
| Electrometric N. N. | 137.4 |
| Molecular weight | 815.0 |

EXAMPLE 2

This example illustrates the reaction between decene-1 and phosphorus sesquisulfide at 500° F. in a nitrogen atmosphere with no organic peroxide present.

A ½ liter stainless steel bomb was flushed with nitrogen gas and then charged with 1.40 grams (1.0 mole) of decene-1 and 14.7 grams (0.066 mole) of phosphorus sesquisulfide. The bomb was sealed and heated at 500° F. for 5 hours, after which time it was allowed to cool overnight. The contents were filtered and topped at a liquid temperature of 216° F. under a pressure of 4 millimeters. Seven grams of product remained in the distillation flask. This product had the following analysis:

| | |
|---|---|
| Percent phosphorus | 8.99 |
| Percent sulfur | 6.18 |
| Electrometric N. N | 97.0 |
| Molecular weight | 450.0 |

A comparison of the analysis of this product with the analysis of the product obtained in Example 1 illustrates the difference between the products obtained by the reaction of the phosphorus sesquisulfide and the olefin in the absence of the organic peroxide and in the presence of the organic peroxide.

EXAMPLE 3

This example illustrates the fact that no reaction takes place when decene-1 is reacted with phosphorus sesquisulfide at 336° F. in the absence of organic peroxide.

A mixture of 140 grams (1.0 mole) of decene-1 and 14.7 grams (0.066 mole) of phosphorus sesquisulfide were heated with agitation in a nitrogen atmosphere in a reaction vessel for 5 hours at 336° F. The contents were then filtered and topped by heating to a liquid temperature of 374° F. under 2.0 millimeters pressure. No residual product remained in the distillation flask.

The preparation of the reaction products of the invention is further illustrated by the following examples.

EXAMPLE 4

A mixture of 505 grams (2.0 moles) of 1-octadecene and 30 grams (0.136 mole) of phosphorus sesquisulfide were heated with agitation in a nitrogen atmosphere in a reaction vessel for 5 hours at 335–392° F. During the first hour of reaction, 19 grams (0.136 mole) of di-tertiary butyl peroxide were added portionwise. The reaction product was filtered and topped by heating to a liquid temperature of 464° F. under 3.0 milliliters pressure. The residual product (126 grams) was a yellow, waxy material having the following properties:

| | |
|---|---|
| Percent phosphorus | 8.17 |
| Percent sulfur | 5.93 |
| Electrometric N. N | 26 and 83 |

EXAMPLE 5

A 51-gram portion of the filtered residual product obtained in Example 4 was dissolved in 100 milliliters of benzene. Thirty-eight milliliters of barium methylate solution (containing approximately 0.20 gram of barium per milliliter) were added slowly. The reaction mixture was refluxed at 140° F. for one hour and then topped to remove the solvent. A waxy, light red product weighing 60 grams was obtained and had the following characteristics:

| | |
|---|---|
| Percent phosphorus | 6.58 |
| Percent sulfur | 2.24 |
| Percent barium | 12.70 |
| Electrometric N. N | 10 |

EXAMPLE 6

A mixture of 112 grams (1.0 mole) of octene-1 and 14.7 grams (0.066 mole) of phosphorus sesquisulfide were heated with agitation in a nitrogen atmosphere in a reaction vessel for 5 hours at 212° F. During the first hour of reaction, 19.5 grams (0.088 mole) of benzoyl peroxide were added portionwise. The reaction product was filtered and then topped by heating to a liquid temperature of 347° F. under 5.0 millimeters pressure. The residual product (21 grams) was a yellow, oily material having the following properties:

| | |
|---|---|
| Percent phosphorus | 9.02 |
| Percent sulfur | 8.46 |
| Electrometric N. N | 199.0 |

EXAMPLE 7

A mixture of 112 grams (1.0 mole) of octene-2 and 14.7 grams (0.066 mole) of phosphorus sesquisulfide were heated with agitation in a nitrogen atmosphere in a reaction vessel for 5 hours at 212 F. During the first hour of reaction, 19.5 grams (0.088 mole) of benzoyl peroxide were added portionwise. The reaction product was filtered and then topped by heating to a liquid temperature of 347° F. under 6.0 millimeters pressure. The residual product (25.0 grams) had the following properties:

| | |
|---|---|
| Percent phosphorus | 10.27 |
| Percent sulfur | 7.76 |
| Electrometric N. N | 225.0 |

EXAMPLE 8

A mixture of 112 grams (1.0 mole) of 2-ethyl hexene-1 and 14.7 grams (0.066 mole) of phosphorus sesquisulfide were heated with agitation in a nitrogen atmosphere in a reaction vessel for 5 hours at 212° F. During the first hour of reaction, 19.5 grams (0.088 mole) of benzoyl peroxide were added portionwise. The reaction product was filtered and then topped by heating to a required temperature of 348° F. under 4.0 millimeters pressure. The residual product (18.0 grams) had the following properties:

| | |
|---|---|
| Percent phosphorus | 8.25 |
| Percent sulfur | 8.09 |
| Electrometric N. N | 135.0 |

EXAMPLE 9

A ½ liter stainless steel bomb was flushed with nitrogen gas and then charged with 14.7 grams (0.066 mole) of phosphorus sesquisulfide and 6.5 grams (0.044 mole) of di-tertiary butyl peroxide. The bomb was sealed and charged (through a pressure line) with 126.0 grams (3.0 moles) of propylene at Dry Ice-acetone temperature. The bomb was heated at 348° F. for 5 hours, the pressure rising to 1650 pounds per square inch. The bomb was then allowed to cool overnight to room temperature and the excess pressure released. The residual product (9.6 grams) was filtered. The oily filtrate had the following analysis:

| | |
|---|---|
| Percent phosphorus | 5.32 |
| Percent sulfur | 7.04 |
| Electrometric N. N | 36.0 |

EXAMPLE 10

A mixture of 136.0 grams (1.0 mole) of alpha-pinene and 14.7 grams (0.066 mole) of phosphorus sesquisulfide were heated with agitation in a nitrogen atmosphere in a reaction vessel for 7.5 hours at 302° F. During the first hour of reaction, 6.5 grams (0.0444 mole) of di-tertiary butyl peroxide were added portionwise. The reaction mixture was filtered and then topped by heating to a liquid temperature of 302° F. under 3.0 millimeters pressure. The residual product (25.5 grams) had the following analysis:

| | |
|---|---|
| Percent phosphorus | 13.0 |
| Percent sulfur | 12.7 |
| Electrometric N. N | 135.0 |

The products prepared by the process of the invention provide effective additives for mineral lubricating oils as illustrated by the following tests.

Oxidation test

The decene-1-phosphorus sesquisulfide-di-tertiary butyl peroxide product produced as described in Example 1 was blended in a solvent-refined, S. A. E. 10 grade oil of Pennsylvania origin in concentrations of 0.125%, 0.25% and 0.5% by weight. Each of these blends and also a sample of the unblended oil were subjected to catalytic oxidation tests as follows. A 25 cc. sample of the oil is placed in a 200 x 25 mm. test tube with 15.6 square inches of sand blasted iron wire, 0.78 square inch of polished copper wire, 0.87 square inch of polished aluminum wire and 0.167 square inch of polished lead surface. The oil is heated to 260° F. and dry air is passed through it at a rate of 10 liters per hour for a period of 40 hours. In each test, the following data were recorded: (1) Increase in the neutralization number (N. N.); (2) the percent viscosity increase at 210° F.; (3) the extent of sludge formation and (4) the weight lost by the lead specimen. The results of the tests were as follows:

| Concentration of Product in Oil | 0.0% | 0.125% | 0.25% | 0.5% |
|---|---|---|---|---|
| Neutralization Number: | | | | |
| Initial | Nil | Nil | 0.4 | 1.0 |
| Final | 15.7 | 0.5 | 0.8 | Nil |
| K. V. @ 210° F.: | | | | |
| Initial | 5.74 | 5.73 | 5.72 | 5.75 |
| Final | 12.91 | 5.81 | 5.76 | 5.78 |
| Percent Viscosity Increase | 125.0 | 1.4 | 0.70 | 0.52 |
| Pb Loss (mgs.) | 235.0 | 5.2 | 0.9 | 0.1 |
| Sludge | Nil | Nil | Nil | Nil |

It will be seen from the data that the decene-1-$P_4S_3$-di-tertiary butyl peroxide product effectively inhibited increase in the acidity and viscosity of the oil and also the loss in weight of the lead specimen due to corrosion.

Engine test

The barium salt of the octadecene-1-phosphorus sesquisulfide-di-tertiary butyl peroxide reaction product, prepared as in Example 5, was blended in 2% concentration by weight in a solvent-refined, S. A. E. 20 grade oil of Pennsylvania origin. This blend and a sample of the base oil alone were subjected to the Lauson D-5 Engine Test. This test determines the effectiveness of an engine oil in preventing piston fouling as measured by the cleanliness of the rings, lands, ring grooves and piston skirt. Engine cleanliness (E. C.) ratings are assigned, based on a scale of 100 to 0, a 100 rating signifying a perfectly clean condition and a 0 rating representing the worst possible deposit condition. Oil deterioration, as measured by the neutralization number (N. N.) of the oil, and corrosiveness, as indicated by bearing weight loss, are also determined. In conducting the test, a single cylinder, 4-cycle, liquid-cooled Lauson engine with a splash lubrication and having a copper-lead bearing is operated for 60 hours at a speed of 1825 R. P. M. while maintaining a jacket temperature of 275° F. and an oil temperature of 225° F.

The engine is perfectly clean at the start of the test and the copper-lead bearing is accurately weighed before and after the test run to determine any loss in weight thereof. The pertinent data were as follows:

| Concentration of Product in Oil | 0.0% | 2.0% |
|---|---|---|
| E. C. Rating | 63.0 | 86.0 |
| Bearing Weight Loss: | | |
| Top | 0.383 | 0.002 |
| Bottom | 0.404 | 0.000 |
| N. N. | 3.4 | 0.90 |
| Percent Viscosity Increase at 210° F. | 33.0 | 11.1 |

These data demonstrate the high effectiveness of the barium salt of the 1-octadecene-$P_4S_3$-di-tertiary butyl peroxide product in inhibiting bearing corrosion and maintaining engine cleanliness.

The reaction products of the invention effectively improve lubricating oils when added thereto in amounts ranging from about 0.1% to about 10% by weight, the usual requirement, however, being from about .5% to about 5%.

Besides their utility as lubricating oil additives, the reaction products provided by the invention also find useful application in the field of insecticides and as plasticizers, polishing agents, rust inhibitors, synthetic lubricants, etc.

Although the invention has been illustrated herein by means of certain specific examples and tests, it is not intended that the scope thereof be limited in any way thereby but only as indicated in the following claims.

We claim:

1. The process for preparing an acidic, phosphorus- and sulfur-containing reaction product which comprises: (1) reacting together (a) from about 4 to about 100 moles of a mono-olefin having from 2 to about 20 carbon atoms, (b) from about 0.5 mole to about 2 moles of an organic peroxide selected from the group consisting of di-alkyl peroxides and di-carboxy acyl peroxides and (c) about 1 mole of $P_4S_3$, at a temperature of from about 100° F. to about 500° F., in an anaerobic atmosphere, and (2) recovering the said reaction product from the reaction mixture.

2. The process for preparing an acidic, phosphorus- and sulfur-containing reaction product which comprises (1) reacting together (a) from about 4 to about 100 moles of a mono-olefin having from 2 to about 20 carbon atoms, (b) from about 0.5 mole to about 2 moles of di-tertiary butyl peroxide and (c) about 1 mole of $P_4S_3$, at a temperature of from about 100° F. to about 500° F., in an anaerobic atmosphere, and (2) recovering the said reaction product from the reaction mixture.

3. The process for preparing an acidic, phosphorus- and sulfur-containing reaction product which comprises (1) reacting together (a) from about 4 to about 100 moles of a mono-olefin having from 2 to about 20 carbon atoms, (b) from about 1 mole to about 2 moles of benzoyl peroxide and (c) about 1 mole of $P_4S_3$, at a temperature of from about 100° F. to about 500° F., in an anaerobic atmosphere, and (2) recovering the said reaction product from the reaction mixture.

4. The process for preparing an acidic, phosphorus- and sulfur-containing reaction product which comprises (1) reacting together (a) from about 10 to about 20 moles of decene-1, (b) from about 0.5 mole to about 2 moles of di-tertiary butyl peroxide and (c) about 1 mole of $P_4S_3$, at a temperature of from about 100° F. to about 500° F., in an anaerobic atmosphere, and (2) recovering the said reaction product from the reaction mixture.

5. The process for preparing an acidic, phosphorus- and sulfur-containing reaction product which comprises (1) reacting together (a) from about 10 to about 20 moles of octadecene-1, (b) from about 0.5 mole to about 2 moles of di-tertiary butyl peroxide and (c) about 1 mole of $P_4S_3$, at a temperature of from about 100° F. to about 500° F., in an anaerobic atmosphere, and (2) recovering the said reaction product from the reaction mixture.

6. The process for preparing an acidic, phosphorus- and sulfur-containing reaction product which comprises (1) reacting together (a) from about 10 to about 20 moles of alpha-pinene, (b) from about 0.5 mole to about 2 moles of di-tertiary butyl peroxide and (c) about 1 mole of $P_4S_3$, at a temperature of from about 100° F. to about 500° F., in an anaerobic atmosphere, and (2) recovering the said reaction product from the reaction mixture.

7. The process for preparing a metal salt of an acidic, phosphorus- and sulfur-containing reaction product which comprises (1) reacting together (a) from about 4 to about 100 moles of a mono-olefin having from 2 to about 20 carbon atoms, (b) from about 0.5 mole to about 2 moles of an organic peroxide selected from the group consisting of di-alkyl peroxides and di-carboxy acyl peroxides and (c) about 1 mole of $P_4S_3$, at a temperature of from about 100° F. to about 500° F., in an anaerobic atmosphere, to form an acidic, phosphorus- and sulfur-containing reaction product, (2) recovering said product from the reaction mixture and (3) reacting the said product with a basic compound of an alkaline earth metal.

8. The process for preparing a barium salt of an acidic, phosphorus- and sulfur-containing reaction product which comprises (1) reacting together (a) from about 10 to about 20 moles of octadecene-1, (b) from about 0.5 mole to about 2 moles of di-tertiary butyl peroxide and (c) about 1 mole of $P_4S_3$, at a temperature of from about 100° F. to about 500° F., in an anaerobic atmosphere, to form a phosphorus- and sulfur-containing reaction product, (2) recovering said product from the reaction mixture and (3) reacting the said product with barium hydroxide.

9. As a new composition of matter, a material selected from the group consisting of (A) an acidic, phosphorus- and sulfur-containing reaction product prepared by the method which comprises (1) reacting together (a) from about 4 to about 100 moles of a mono-olefin having from 2 to about 20 carbon atoms, (b) from about 0.5 mole to about 2 moles of an organic peroxide selected from the group consisting of di-alkyl peroxides and di-carboxy acyl peroxides and (c) about 1 mole of $P_4S_3$, at a temperature of from about 100° F. to about 500° F., in an anaerobic atmosphere, and (2) recovering the said reaction product from the reaction mixture, and (B) an alkaline earth metal salt of said reaction product.

10. As a new composition of matter, an acidic, phosphorus- and sulfur-containing reaction product prepared by the method which comprises (1) reacting together (a) from about 4 to about 100 moles of a mono-olefin having from 2 to about 20 carbon atoms, (b) from about 0.5 mole to about 2 moles of an organic peroxide selected from the group consisting of di-alkyl peroxides and di-carboxy acyl peroxides and (c) about 1 mole of $P_4S_3$, at a temperature of from about 100° F. to about 500° F., in an anaerobic atmosphere and (2) recovering the said reaction product from the reaction mixture.

11. As a new composition of matter, an acidic, phosphorus- and sulfur-containing reaction product prepared by the method which comprises (1) reacting together (a) from about 4 to about 100 moles of a mono-olefin having from 2 to about 20 carbon atoms, (b) from about 0.5 mole to about 2 moles of di-tertiary butyl peroxide and (c) about 1 mole of $P_4S_3$, at a temperature of from about 100° F. to about 500° F., in an anaerobic atmosphere and (2) recovering said reaction product from the reaction mixture.

12. As a new composition of matter, an acidic, phosphorus- and sulfur-containing reaction product prepared by the method which comprises (1) reacting together (a) from about 4 to about 100 moles of a mono-olefin having from 2 to about 20 carbon atoms, (b) from about 1 mole to about 2 moles of benzoyl peroxide and (c) about 1 mole of $P_4S_3$, at a temperature of from about 100° F. to about 500° F., in an anaerobic atmosphere and (2) recovering the said reaction product from the reaction mixture.

13. As a new composition of matter, an acidic, phosphorus- and sulfur-containing reaction product prepared by the method which comprises (1) reacting together (a) from about 10 to about 20 moles of decene-1, (b) from about 0.5 mole to about 2 moles of di-tertiary butyl peroxide and (c) about 1 mole of $P_4S_3$, at a temperature of from about 100° F. to about 500° F., in an anaerobic atmosphere and (2) recovering the said reaction product from the reaction mixture.

14. As a new composition of matter, an acidic, phosphorus- and sulfur-containing reaction product prepared by the method which comprises (1) reacting together (a) from about 10 to about 20 moles of octadecene-1, (b) from about 0.5 mole to about 2 moles of di-tertiary butyl peroxide and (c) about 1 mole of $P_4S_3$, at a temperature of from about 100° F. to about 500° F., in an anaerobic atmosphere and (2) recovering the said reaction product from the reaction mixture.

15. As a new composition of matter, an acidic, phosphorus- and sulfur-containing reaction product prepared by the method which comprises (1) reacting together (a) from about 10 to about 20 moles of alpha-pinene, (b) from about 0.5 mole to about 2 moles of di-tertiary butyl peroxide and (c) about 1 mole of $P_4S_3$, at a temperature of from about 100° F. to about 500° F., in an anaerobic atmosphere and (2) recovering the said reaction product from the reaction mixture.

16. As a new composition of matter, a metal salt of an acidic, phosphorus- and sulfur-containing reaction product prepared by the method which comprises (1) reacting together (a) from about 10 to about 20 moles of a mono-olefin having from 2 to about 20 carbon atoms, (b) from about 0.5 mole to about 2 moles of an organic peroxide selected from the group consisting of di-alkyl peroxides and di-carboxy acyl peroxides and (c) about 1 mole of $P_4S_3$, at a temperature of from about 100° F. to about 500° F., in an anaerobic atmosphere, to form an acidic, phosphorus- and sulfur-containing reaction product, (2) recovering said reaction product from the reaction mixture and (3) reacting the said product with a basic compound of an alkaline earth.

17. As a new composition of matter, a barium salt of an acidic, phosphorus- and sulfur-containing reaction product which comprises (1) reacting together (a) from about 10 to about 20 moles of octadecene-1, (b) from about 0.5 mole to about 2 moles of di-tertiary butyl peroxide and (c) about 1 mole of $P_4S_3$, at a temperature of from about 100° F. to about 500° F., in an anaerobic atmosphere, to form an acidic, phosphorus- and sulfur-containing reaction product, (2) recovering said reaction product from the reaction mixture and (3) reacting the said product with barium hydroxide.

References Cited in the file of this patent

UNITED STATES PATENTS

| | | |
|---|---|---|
| 2,316,083 | Loane et al. | Apr. 6, 1943 |
| 2,640,053 | Hill et al. | May 26, 1953 |

OTHER REFERENCES

Webster's New International Dictionary, 2d ed., Unabridged 1950, page 2710.